July 27, 1937.  T. B. BUFFUM  2,088,462
RESERVOIR COOKING UTENSIL
Filed April 19, 1934   2 Sheets-Sheet 1

Thomas B. Buffum
INVENTOR
BY Thomas A. Jenckes
ATTORNEY

July 27, 1937.  T. B. BUFFUM  2,088,462
RESERVOIR COOKING UTENSIL
Filed April 19, 1934   2 Sheets-Sheet 2

Thomas B. Buffum
INVENTOR
BY Thomas A. Jenckes
ATTORNEY

Patented July 27, 1937

2,088,462

UNITED STATES PATENT OFFICE 2,088,462

RESERVOIR COOKING UTENSIL

Thomas B. Buffum, Providence, R. I.

Application April 19, 1934, Serial No. 721,265

3 Claims. (Cl. 53—2)

My invention relates to improvements in cooking utensils particularly those adapted to cook vegetables or other materials by the passage of steam therethrough without contact with water. Broadly my invention includes a vapor generating chamber, a cooking vessel mounted thereon, means connected to said vapor generating chamber to lead said vapor to or through said cooking vessel, a reservoir, a conduit connecting said reservoir and vapor generating chamber and means in said conduit to maintain a constant liquid level in said vapor generating chamber, preferably controlled by the liquid level in said vapor generating chamber. I preferably do this by so connecting the conduit to said reservoir and vapor generating chamber that it will act as a combined liquid and air conduit so that the rise and fall of the liquid level in the vapor generating chamber will automatically liquid seal or partially open said conduit to permit passage of air from said vapor generating chamber or other source of air supply to said reservoir to permit flow of liquid from said reservoir to said vapor generating chamber to continuously maintain a constant liquid level in said vapor generating chamber.

The preferred embodiment of my invention preferably comprises a standard household cooking utensil adapted to be rested on the top of the range, electric, gas, oil or other stove for cooking or other heating purposes. In my preferred embodiment, I preferably employ as a reservoir a detachable refillable bottle and provide a conduit leading from said vapor generating chamber with an upwardly projecting mouth so that the inverted bottle may be placed in said mouth and so held by the mouth of the conduit that the bottle mouth is spaced the same distance from the bottom of the vapor generating chamber as the desired height of liquid in the vapor generating chamber. Thus the liquid will flow freely from the bottle to the vapor generating chamber until the water or other liquid rises in the vapor generating chamber to the level of the bottle mouth, in which instance the liquid will air seal the supplying reservoir and conduit preventing any further flow until the liquid in the vapor generating chamber again falls below the level of the mouth of the inverted bottle or other reservoir when the process will then be automatically repeated ad infinitum.

An object of my invention is therefore to provide a relatively low depth of liquid or a small volume of water in the cooker or steam or vapor generating chamber for optimum steam or other vapor creating conditions and I thus provide a construction exposing a small amount of water or other liquid to the heating medium and am able to do this for the reason that my improved connection to the reservoir or bottle constantly maintains a sufficient liquid level in the vapor generating chamber for the purpose of optimum steam or other vapor creating conditions. An object of my invention therefore is to save a large amount of the heat formerly thought necessary in heating such vessels, as only a relatively small amount of water or other liquid to generate the desired steam or other vapor is needed to be heated and kept hot.

A further object of my invention is to provide a continuous cooking process which due to the automatic valve action of the conduit or bottle mouth makes it possible to cook food or other substances any desired length of time without danger of the boiling receptacle going dry and burning through or spoiling the materials being cooked. A further object of my invention is to provide a liquid replenishing method for the vapor generating chamber which is automatic and at the same time permits the reservoir to be refilled whenever desired without it being necessary to stop the cooking process, as it takes such a little time to refill a bottle that during that short interval the liquid level in the vapor generating chamber will hardly be affected.

A further object of my invention is to provide an automatic reservoir gauge through the medium of using a transparent bottle as the water reservoir, thus providing a visible gauge showing the operator how much water or other liquid supply is still available.

A further object of my invention is to provide in a device of this description a more healthful method of cooking food or other material without building up the steam pressure by providing a steam outlet in the cooking vessel permitting the continuous cooking by steam or vapor for any desired length of time.

To lead steam through the cooking vessel proper, I preferably provide it with a perforated base adjacent to the steam generating chamber and a steam outlet in another portion thereof, such as the cover. It is apparent, however, that if desired, such as in cooking oatmeal or other substances where the condensation of water would affect the heating qualities, that if desired the bottom of the base of the cooking chamber may be imperforate.

Further features of my invention relate to the provision of a spring plunger in the reservoir bottle mouth adapted to abut the base of the pipe or conduit leading from the reservoir to the vapor generating chamber to automatically open the bottle mouth when the bottle is placed in inverted position in the conduit neck; a specific type of means preferably comprising a bent wire hook attached to the vapor generating chamber to hold the bottle in inverted position and the specific type of handle I employ for the lower end of the inverted bottle (upper when in inverted position) to readily lift it out for refilling purposes.

A further feature of my invention relates to the provision of supplemental cooking chambers or vessels stacked one on top of the other on top of the vapor generating chamber, the upper one of which if desired may be closed for cooking substances which steam condensation would affect, such as oatmeal, preserves, etc. and the lower ones having perforated bottoms for ready passage of steam therethrough to permit my improved type of steam cooking.

Further features of my invention relate to the improved specific type of means I preferably employ where a stack of cooking vessels are employed to carry steam to the base of the upper vessels, which may be employed if desired in a stack of cooking vessels without having a reservoir connected to the vapor generating chamber thereof which provides a novel type of means for this purpose.

These and such other objects of my invention as hereinafter appear will be best understood from a description of the embodiments thereof shown in the accompanying drawings illustrating my invention as applied to steam boiling utensils.

In the drawings, Fig. 1 is a side elevation of a cooking utensil constructed in accordance with my invention with parts of the reservoir thereof, the cooking utensil proper, including the cooking chamber and the steam generating chamber and the conduit connecting the same being broken away and shown in section.

Figure 1:
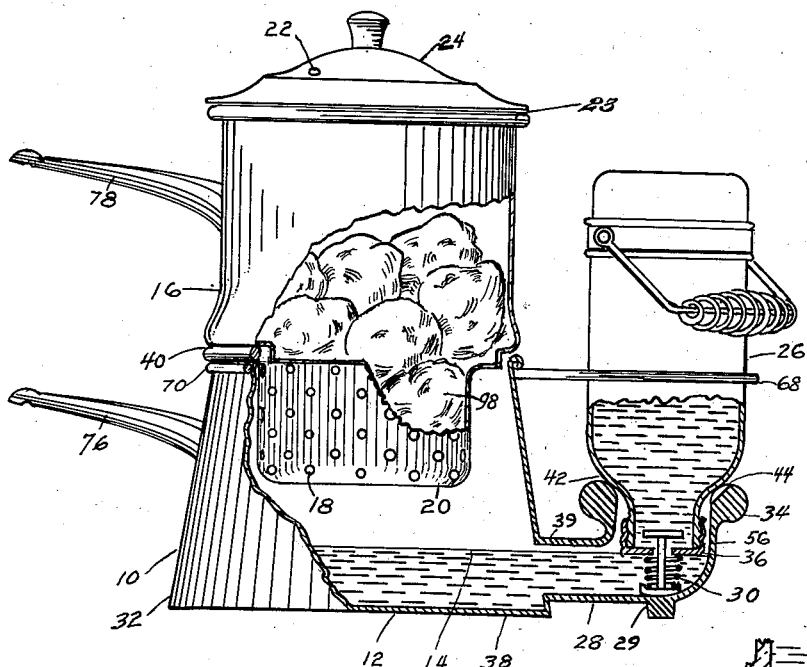
Figure 3:
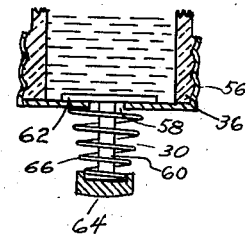
Fig. 3 is an enlarged sectional view showing the improved type of plunger valve I preferably employ in closed position.
Figure 2:
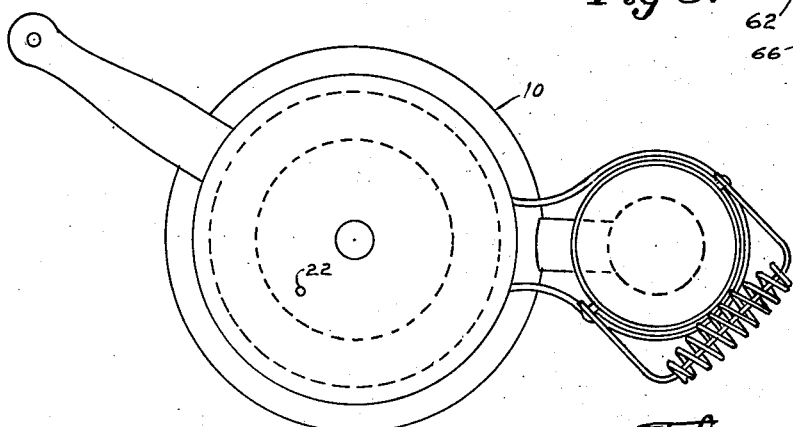
Fig. 2 is a plan view of the embodiment of my invention shown in Fig. 1.

In the drawings, wherein like characters of reference indicate like parts throughout, 10 generally indicates a cooking utensil constructed in accordance with my invention. In the broader aspects of my invention said cooking utensil includes the combination of a vapor generating chamber 12 adapted to contain a relatively thin layer of liquid 14 to be vaporized, a cooking vessel 16 and means connected to said vaporizing chamber to lead vapor to or through said cooking vessel 12, in my preferred embodiment comprising the perforations 18 in the base 20 of the cooking vessel to lead steam to the cooking vessel and if desired the hole 22 in the cover 24 of the cooking vessel to provide in combination with the perforations 18, means to lead steam through the cooking vessel, a reservoir 26, a conduit 28 connecting said reservoir and steam generating chamber and means 30 in said conduit to maintain a constant liquid level in said vapor generating chamber preferably controlled in its action by the liquid level in said vapor generating chamber to maintain a constant level therein in use. In my preferred embodiment shown the conduit 28 comprises the combined water and air conduit connected to said vapor generating chamber 12 near the base thereof preferably spaced from the base thereof as shown to permit the usual enlarged base 32 thereof to be inserted in the usual range hole and the conduit to project therefrom to said reservoir 26 so that the rise and fall of the liquid level 14 in said vapor generating chamber 12 will automatically liquid seal or partially open said conduit 28 to permit passage of air from said vapor generating chamber to said reservoir to permit flow of fluid therefrom to maintain a constant liquid level in said vapor generating chamber. In my preferred embodiment I provide the conduit 28 with an upwardly flaring mouth 34 and provide as the reservoir 26 the detachable bottle 26 adapted to rest in inverted position within said mouth 34 and in this instance the distance of the mouth 36 of the bottle 26 from the base 38 of the vapor generating chamber 12 regulates the desired height of liquid 14 in the vapor generating chamber 12 regardless of the size of the conduit 28. It is obvious, however, that where a detachable reservoir 26 is not provided that the upper portion 39 of the conduit itself may provide this liquid seal.

In my preferred embodiment I preferably construct these means as follows: the vapor generating chamber 12 is preferably provided with the open top 40. The liquid feed pipe 28 leads, as explained, laterally from the vapor generating chamber 12 and is provided as stated with the upwardly projecting mouth 34. The inverted preferably transparent bottle 26 provided with the usual flaring portion 42 leading to the mouth 36 thereof has said flaring portion resting on the flaring mouth 34 of said conduit 28 so as to space the bottle mouth 36 from the base 38 of said vapor generating chamber the desired height of liquid in said vapor generating chamber to provide a means to admit more liquid therein as said level sinks below said bottle mouth 36 on the application of heat to keep a constant supply of water in said vapor generating chamber and an airseal when the water level in the steam generating chamber 14 has reached the height of said inverted mouth 36. As stated hitherto if the conduit 28 is made integral with the reservoir 26 the top of the conduit will form the sealing or valve element instead of the mouth of the reservoir.

To overcome a building up of pressure within the vapor generating chamber which would tend to cause the liquid 14 to flow backwards from the conduit 28 and become expelled through the mouth 42 of said conduit I provide means to permit escape of vapor from said vapor generating chamber to prevent vapor therein from forcing liquid out of the mouth of the feed conduit. In the embodiment shown in Fig. 1, said means comprises the grooves 44 cut in the mouth 42 and in the embodiment shown in Fig. 4 said means comprises a safety flap 46 fitting over a hole 48 in the side wall of the vaporizing chamber pivotally mounted thereon as at 50 and suitably weighted as at 52 to blow off at the desired pressure in the vaporizing chamber. The cooking vessel 16 is provided with a base 20 adapted to rest in the open upper end 40 of said vapor generating chamber and in the embodiment of my invention shown in Fig. 4 said cooking vessel 16 is preferably provided with the open top 23. In the embodiment shown in Fig. 1 I provide means to lead steam from the vapor generating chamber 12 through the cooking vessel 16, in the embodiment shown therein said means comprising the perforated holes 18 in the base 20 of the cooking vessel 16 and the hole 22 in the cover 24 of said cooking vessel.

In the embodiments of my invention shown,

I also provide the stopper 30 for said bottle mouth 36 having a spring actuated plunger 60 therein adapted to abut the conduit base 29 to open said stopper 30 when said bottle is placed in inverted position in said conduit mouth 42. While this spring actuated stopper may be constructed in any suitable manner, I preferably provide a cap 56 adapted to be threaded on to said bottle mouth 36 having a central hole 58 therein, a plunger 60 passing through said hole 58 and having a valve 62 adapted to abut the upper surface of said cap adjacent said hole when in inverted position to close the mouth 36 of said bottle when inverted. Said plunger 60 is provided at its low inverted end thereof with a cap 64 and a spring 66 is provided having the inner end abutting the surface of the cap 56 and the outer end abutting the surface of the cap 64. As shown in Fig. 1 when said bottle is placed in an inverted position within the conduit mouth 42 the cap 64 thereof strikes the base 29 of the conduit 28 pressing the spring 66 to raise the valve 62 away from a position closing said central hole 58 in said cap to an open position permitting the ready flow of water from the reservoir 26 through the conduit 28 into the vapor generating chamber 12. If desired, however, the stopper 30 may be dispensed with, but it provides an entirely satisfactory detail to prevent any spilling of water in the rapid replenishing of the detachable reservoir 26 of my improved embodiment. I also provide means carried by said vapor chamber 14 for rigidly holding the inverted bottle 26 in rigid vertical position, in my preferred embodiment comprising a circular ring 68 of surrounding wire secured to the upper portion of said vaporizing chamber 14, preferably by continuously leading the wire around said vaporizing chamber to form the vaporizing chamber encircling loop 70.

Figure 4:
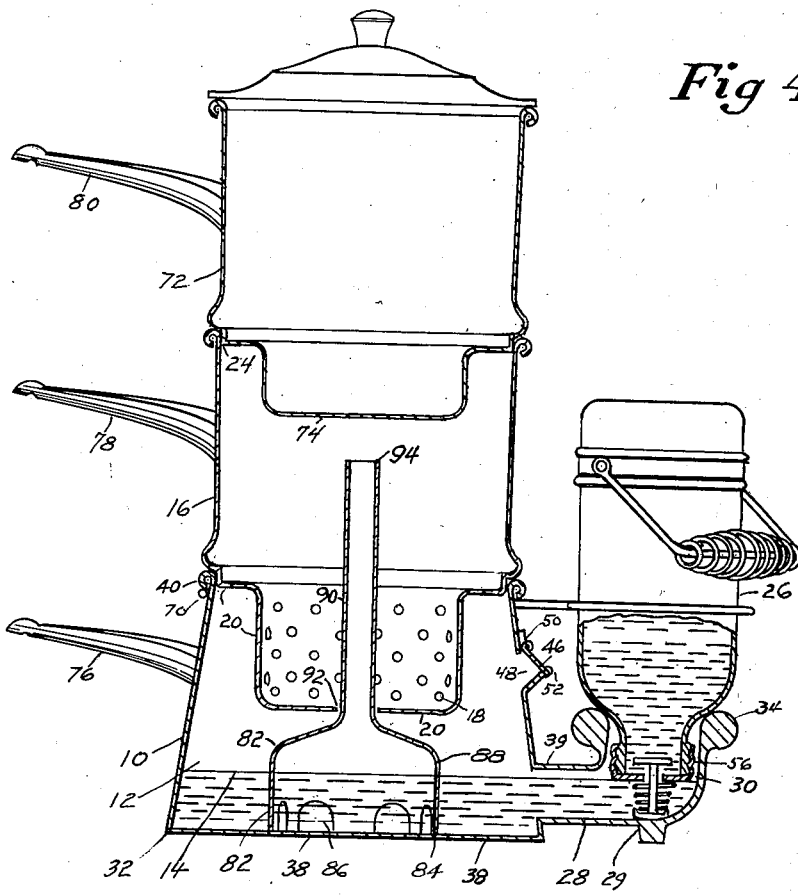
Fig. 4 is a side elevation of an embodiment of my invention employing a plurality of stacked cooking vessels, part of the reservoir thereof being shown in elevation.
Figure 5:
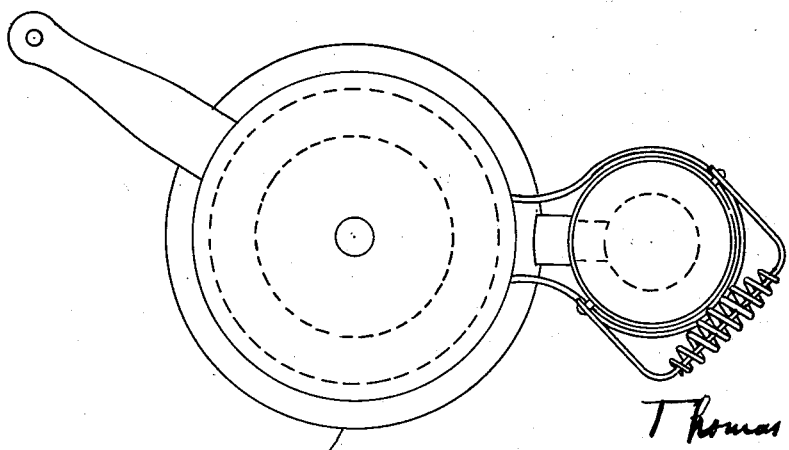
Fig. 5 is a plan view of the embodiment of my invention shown in Fig. 4.

In the embodiment of my invention shown in Fig. 4 I provide said first cooking vessel 16 with an open top 40 and provide a second cooking vessel 72 resting thereon having if desired a liquid tight base 74 as shown in Fig. 4, although if desired the base 74 may be perforated as the base 20 of the first cooking vessel 16. In my preferred embodiment shown I provide the handle 76 for the steam generating chamber, the handle 78 for the detachable cooking vessel 16 and the handle 80 for the upper cooking vessel 72. As shown I preferably centrally depend the base 20 of the first cooking vessel 16 a substantial amount and depend the base 74 of the second cooking vessel 72 a lesser amount so as to provide in both instances larger cooking space for the first cooking vessel 16.

In order that the upper cooking vessel 72 may be better heated I provide means to carry steam from the vapor generating chamber 12 to the base 74 of said second vessel. In my preferred embodiment shown in Fig. 4 which I believe is new for all types of multiple vessel cooking utensils whether or not combined with a reservoir 26, I provide the inverted bell 82 terminating in the lower cylindrical portion having the lower edge 84 thereof adapted to rest on the base 38 of the vaporizing chamber, said cylindrical portion 82 being preferably provided with the radial holes 86 therein. Said cylindrical portion 82 is of such a length as to extend a substantial distance above the water level 14 as at 88 and I provide a steam discharge pipe 90 projecting upwardly from said cylindrical portion 82, through a hole 92 in the base 20 of the first cooking vessel 16 and discharging as at 94 immediately below the base 74 of said cooking vessel. It is apparent that with desired stacked multiplicity of vessels on top of the initial cooking vessel 16 that separate pipes 90 should be led from said bell 82 each terminating in its discharge port 94 immediately below the respective base of its respective vessel, or instead a single pipe may be provided projecting upwardly through the respective lower bases and having lateral discharge ports for this purpose.

It is apparent therefore that I have provided a novel type of cooking utensil having a vapor generating chamber adapted to continuously produce the desired amount of steam to thoroughly cook vegetables, or other materials 98 contained within the various cooking vessels employed therein from a relatively thin layer of water provided with reservoir means to automatically continuously maintain said water level at the desired height for optimum cooking conditions and that I have provided a novel type of cooking utensil provided with a supplemental feed reservoir to maintain said constant level with the advantages heretofore described.

It is understood that my invention is not limited to the specific embodiments shown and that various deviations may be made therefrom without departing from the spirit and scope of the appended claims.

What I claim is:

1. In a cooking utensil, a vapor generating chamber, having an open top, a cooking vessel having an open top resting on the open top of the vapor generating chamber, a second cooking vessel on top of said first cooking vessel, and means to carry vapor to the base of said second vessel, comprising a bell resting on the base of said vapor generating chamber having radial holes near the base thereof and extending a substantial distance above the liquid level and a vapor discharge conduit extending upwardly therefrom through said lower cooking vessel and discharging immediately below the base of said second cooking vessel and means to maintain the liquid level in said vapor generating chamber only slightly above the radial bell holes to insure the passage of steam only through said vapor discharge conduit.

2. In a cooking utensil, a vapor generating chamber, having an open top one side of said vapor generating chamber carrying an upwardly disposed opening for receiving an automatic self feeding inverted bottle to have the mouth thereof spaced from the bottom of said vapor generating chamber the desired height of liquid in said vapor generating chamber and a cooking vessel having a perforated base resting on and covering the open top of the vapor generating chamber.

3. In a cooking utensil, a vapor generating chamber, having an open top one side of said vapor generating chamber carrying an upwardly disposed opening for receiving an automatic self feeding inverted bottle to have the mouth thereof spaced from the bottom of said vapor generating chamber the desired height of liquid in said vapor generating chamber, a cooking vessel resting on and covering the open top of the vapor generating chamber, having a perforated base and a cover having a vapor discharge vent therein.

THOMAS B. BUFFUM.